July 29, 1969 W. M. McCAMPBELL 3,458,104
WELD CONTROL SYSTEM USING THERMOCOUPLE WIRE
Filed Dec. 7, 1967

INVENTOR(S)
WILLIAM M. McCAMPBELL
BY
ATTORNEYS

United States Patent Office 3,458,104
Patented July 29, 1969

3,458,104
WELD CONTROL SYSTEM USING THERMOCOUPLE WIRE
William M. McCampbell, Huntsville, Ala., assignor to the United States of America as represented by the Administrator of the National Aeronautics and Space Administration
Filed Dec. 7, 1967, Ser. No. 688,743
Int. Cl. B23k 9/02, 9/06
U.S. Cl. 228—9      6 Claims

ABSTRACT OF THE DISCLOSURE

Control of fusion welding through use of a thermocouple which has a current flow proportional to the heat of the weld at any instantaneous point. The thermocouple circuit is formed by the work plate itself and a wire of dissimilar metal below the work plate and along the seam to be welded. The weld puddle contacting the wire forms the hot thermocouple junction.

BACKGROUND OF THE INVENTION

The invention described herein was made by an employee of the United States Government and may be manufactured and used by or for the Government for governmental purposes without the payment of any royalties thereon or therefor.

The invention relates to electrical control systems for fusion welding and more particularly to a control system based on an electrical analog of the temperature of the welding puddle.

Control of the welding process has generally been by indirect means by which voltage, current, and wire feed travel speed were maintained within close tolerances and, if no changes occurred in any of the uncontrollable variables, a good weld was expected.

One system of direct control of the weld process utilizes an infrared detector to measure the temperature of the fall-through bead. If the temperature is not at the desired level, an electrical signal to the welding controls automatically changes a desired parameter to obtain the correct heat level. However, the use of an infrared detector requires access to the backside of the weld and this is impractical or impossible in some applications. Also, this type of apparatus is usually bulky and expensive because of the precision needed to keep the sensor in step with the torch.

It is therefore, an object of the present invention to provide an electrical welding control system which is simple, easily portable, relatively inexpensive, and compatible with most of the welding apparatus available today.

Other and further objects, uses, and advantages of the present invention will become apparent as the description proceeds.

BRIEF DESCRIPTION OF THE INVENTION

A back-up bar having a longitudinal center groove is applied to the work plate along the seam to be welded. A single thermocouple wire is placed in the groove under a slight tension so as not to contact the work plate. The back-up bar is made of a suitable dielectric material or has a dielectric coating on its surface to prevent any electrical contact with the wire. The wire is of a material dissimilar to the work plate. Another wire similar to the material of the work plate is electrically connected to the dissimilar thermocouple wire by a junction instrument, the instrument being adapted to amplify any thermoelectric current that may flow in the wires so as to provide a suitable electrical input to the welding control means.

During the welding operation the welding puddle falls through from the work plate and contacts the bare thermocouple wire so as to form a hot thermocouple junction and cause a thermoelectric current to flow in the thermocouple circuit formed by the work plate and wires, which current is proportional to the heat of the fall-through of the welding puddle. As the weld progresses down the weld path, the thermocouple output remains indicative of the temperature of the instantaneous fall-through of the welding puddle. The temperature of the welding puddle is determined by the operating parameters of the torch.

This will be more readily understood by the following detailed description when taken together with the accompanying drawings.

DETAILED DESCRIPTION OF THE PRESENTLY PREFERRED EMBODIMENTS

Figure 1:
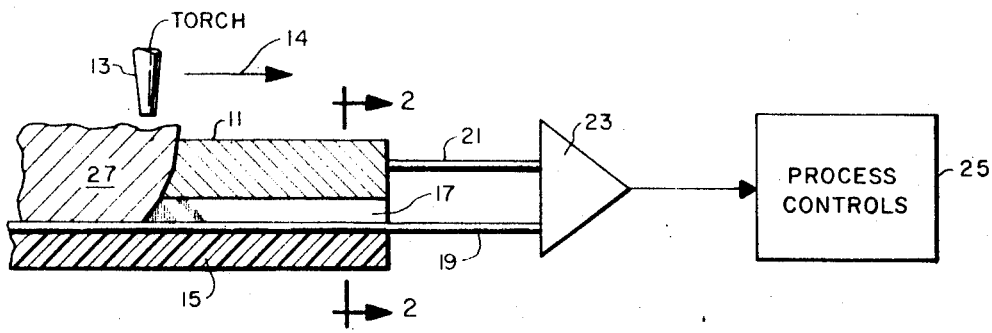
FIGURE 1 is a diagrammatic view illustrating the invention.
Figure 2:
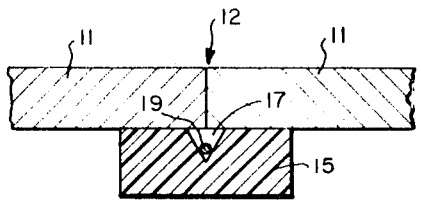
FIGURE 2 is a cross-section view taken along line 2—2 of FIGURE 1.

Referring now to FIGURES 1 and 2 wherein is illustrated by way of example a work plate 11 having a seam 12 being welded in accordance with the present invention. A welding torch 13 is supported by conventional apparatus (not shown) so as to move along the welding path in the direction indicated by the arrow 14. A back-up bar 15 (see FIGURE 2) having a center groove 17 along its longitudinal length is placed against the work plate 11 on the side opposite to that of the welding torch 13 so its groove 17 is beneath the welding path.

A bare thermocouple wire 19 of a material dissimilar to the material of the plate 11 lies in the groove of the back-up bar 15, preferably under a slight tension so as to avoid any accidental contact with the work plate 11. The back-up bar 15 is made of a heat compatible non-metallic dielectric material, as illustrated, or has its groove 17 covered with a heat compatible non-metallic dielectric coating (not shown) to electrically isolate the bare wire 19 from the work plate 11. A suitable non-metallic dielectric material, for example, is porcelain.

Another wire 21 of the same material as the work plate 11 is joined to the plate 11 and connected to the bare wire 19 by an instrument 23 so as to form the cold junction of a thermocouple circuit as discussed further hereinafter. The instrument 23 also amplifies any thermoelectric current flow in the thermocouple circuit in order to drive the necessary control means 25 regulating the welding process. If the material of the work plate 11 is aluminum, for example, a suitable material for the bare wire 19 is constantan.

As the torch 13 moves along the weld path it creates a welding puddle 27 which falls through into the groove 17 of the back-up bar 15 and contacts the bare thermocouple wire 19 therein to form a hot thermocouple junction. Thus, a thermocouple circuit is formed by the work plate 11 and wires 19 and 21 in which an electrical current flows in accordance with the temperature difference between the hot and cold junctions of the circuit. It has been found that as the torch 13 moves progressively along the weld path, the thermocouple current output remains dependent upon the temperature of the instantaneous location of the fall-through of the welding puddle 27. Hence, the increasing length of the fall-through bead 27 contacting the bare thermocouple wire 19 has no appreciable affect on the operation of the circuit. It is necessary, however, that the welding operations start at the location of the bare wire 19 which is most remote from the instrument 23.

The amplified thermoelectric current is fed into the welding process control means 25 so as to cause the necessary automatic welding control action to be accomplished based on the temperature of the instantaneous welding puddle 27. For example, if the temperature of the weld puddle is such that it is less than the desired temperature, then the torch speed can be decreased to provide more heat input per length of weld.

Figure 3:
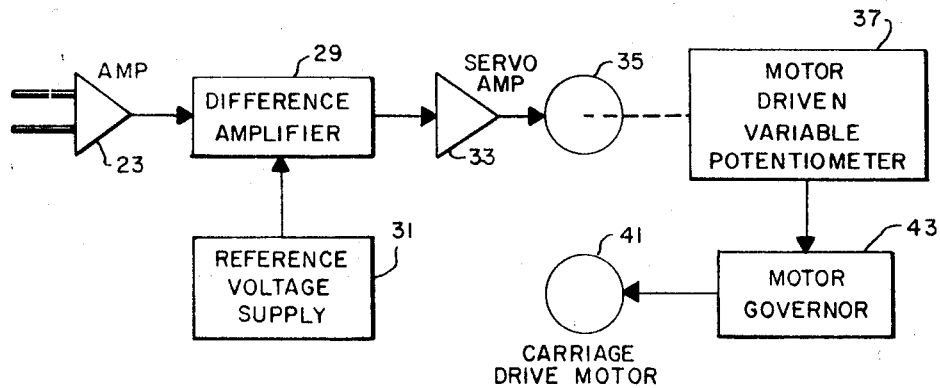
FIGURE 3 illustrates in block diagram form a specific process control using the invention of FIGURE 1.

FIGURE 3 illustrates a specific electrical control means in which the voltage or current of the thermocouple circuit is amplified by the juncture instrument 23 and fed into a difference amplifier 29 where it is balanced against a selected voltage of a voltage supply 31. The selected voltage is proportional to the heat desired. If a voltage difference exists, an error voltage is produced by the difference amplifier 29 which is fed to a servo-amplifier 33 which in turn drives a servo motor 35. The servo motor 35 drives the shaft of a potentiometer 37 so as to increase or decrease the speed of a motor 41 through its electronic governor 43. The motor 41 drives a conventional carriage (not shown) which supports the torch for movement along the work plate.

It is apparent to one skilled in the art that a novel control system has been disclosed which is not limited to any one fusion welding process. Yet, the system is extremely simple and does not require any auxiliary devices at or on the torch. While a specific example has been described for varying the torch travel speed to compensate for temperature, other variables may easily be programmed.

Obviously, many modifications and variations of the present invention are possible in light of the above teachings. It is, therefore, to be understood that within the scope of the appended claims, the invention may be practiced other than as specifically described.

What is claimed is:

1. In a weld control system, the combination comprising:
   a metal work plate adapted to be welded along a path;
   a first bare wire extending along said path and at a slight distance from said plate side opposite the welding operations;
   said first wire being of a metal dissimilar to that of said work plate;
   a second wire joined to said work plate and being of a metal similar to said work plate;
   means joining said first and second wires in a cold junction so that in welding operations when a molten puddle is formed along the weld path of said work plate it will flow into contact with the bare wire and form a hot thermocouple junction and thereby complete a thermocouple circuit with said cold junction.

2. The combination as defined by claim 1 including:
   a back-up bar having a center longitudinal groove, said bar contacting said work plate on the side said first bare wire is located; and
   said first wire being located within the groove of said back-up bar.

3. The combination as defined by claim 2 wherein:
   said back-up bar is of a non-metallic dielectric material so as to prevent the shorting out of said first bare wire.

4. The combination as defined by claim 2 including:
   a welding torch adapted to travel along the weld path of said work plate opposite the side where the first wire is located;
   a control means for regulating said torch; and
   wherein said means joining said first and second wires in a cold junction provides an electrical signal to said control means.

5. The combination as defined by claim 4 wherein said control means regulates the travel speed of the welding torch along the weld path.

6. The combination as defined by claim 2 wherein said work plate is aluminum and said bare wire is constantan.

References Cited
UNITED STATES PATENTS

| | | | |
|---|---|---|---|
| 2,534,958 | 12/1950 | Deming | 228—9 |
| 2,089,015 | 8/1937 | Bucknam | 228—9 |

RICHARD H. EANES, JR., Primary Examiner

U.S. Cl. X.R.

228—50